(12) United States Patent
Meyer (10) Patent No.: US 11,668,344 B2
(45) Date of Patent: Jun. 6, 2023

(54) WEDGE DRIVE HAVING ADJUSTABLE GUIDE APPARATUS

(71) Applicant: FIBRO GmbH, Hassmersheim (DE)

(72) Inventor: Markus Meyer, Wangen im Allgäu (DE)

(73) Assignee: FIBRO GmbH, Hassmersheim (DE)

( * ) Notice: Subject to any disclaimer, the term of this patent is extended or adjusted under 35 U.S.C. 154(b) by 0 days.

(21) Appl. No.: 17/053,387

(22) PCT Filed: Sep. 12, 2018

(86) PCT No.: PCT/EP2018/074634
§ 371 (c)(1),
(2) Date: Nov. 6, 2020

(87) PCT Pub. No.: WO2019/219222
PCT Pub. Date: Nov. 21, 2019

(65) Prior Publication Data
US 2021/0231171 A1 Jul. 29, 2021

(30) Foreign Application Priority Data
May 14, 2018 (DE) ...................... 10 2018 111 366.8

(51) Int. Cl.
*F16C 29/02* (2006.01)
*B21D 37/12* (2006.01)
*B30B 1/40* (2006.01)

(52) U.S. Cl.
CPC .............. *F16C 29/02* (2013.01); *B21D 37/12* (2013.01); *B30B 1/40* (2013.01); *F16C 2322/39* (2013.01)

(58) Field of Classification Search
CPC .............. B30B 1/26; B30B 1/40; F16C 29/02
(Continued)

(56) References Cited

U.S. PATENT DOCUMENTS 1,673,163 A * 6/1928 Schmelzkopf .......... F16C 29/02
82/149
5,551,795 A * 9/1996 Engibarov ............... B23Q 1/28
403/381

(Continued)

FOREIGN PATENT DOCUMENTS

CN 101500725 A 8/2009
CN 202655490 U 1/2013
(Continued)

OTHER PUBLICATIONS

Definition of "clamp", Merriam-Webster on-line dictionary. (Year: 2022).*

(Continued)

*Primary Examiner* — William C Joyce
(74) *Attorney, Agent, or Firm* — Dickinson Wright PLLC (57) ABSTRACT

A wedge drive is provided having a first and a second wedge drive part and an adjustable guide apparatus, formed at least in part by the first and second wedge drive parts, which are movable, by means of a stroke directed in a stroke direction (Z), toward each other in a sliding direction (X, X', X") determined by the guide apparatus and at an angle to the stroke direction (Z), guided by the guide apparatus, wherein a guide part of the guide apparatus is movable along a forced guidance surface by adjusting the position of an adjustment surface and a guide play can be set as a result, wherein a normal vector (N) of the forced guidance surface is at an angle to a plane of movement spanned by the stroke direction (Z) and the sliding direction (X, X', X").

13 Claims, 5 Drawing Sheets

(58) Field of Classification Search
USPC .......................................................... 72/452.9
See application file for complete search history.

(56) References Cited

U.S. PATENT DOCUMENTS

| 6,990,844 | B1 * | 1/2006 | Fidziukiewicz | ....... | B21D 28/32 |
| | | | | | 72/304 |
| 7,114,364 | B2 * | 10/2006 | Weigelt | ................. | B21D 28/32 |
| | | | | | 72/452.9 |
| 7,431,502 | B2 * | 10/2008 | Fidziukiewicz | ....... | B21D 28/32 |
| | | | | | 384/9 |
| 8,689,600 | B2 * | 4/2014 | Weigelt | ................. | B21D 28/32 |
| | | | | | 72/452.9 |
| 2017/0014889 | A1 | 1/2017 | Meyer | | |
| 2017/0014890 | A1 | 1/2017 | Meyer | | |

FOREIGN PATENT DOCUMENTS

| DE | 102008061420 A1 | | 6/2010 |
| DE | 202011108083 U1 | | 2/2013 |
| DE | 102012014546 A1 | | 1/2014 |
| DE | 102014102993 A1 | | 10/2015 |
| JP | 2000-117328 | * | 4/2000 |
| JP | 2003042154 A | | 2/2003 |
| TW | 514567 B | | 12/2002 |
| WO | 2009039895 A1 | | 4/2009 |
| WO | WO 2009/039895 | * | 4/2009 |
| WO | 2014090264 A1 | | 6/2014 |

OTHER PUBLICATIONS

European Patent Office, Rijswijk, Netherlands, International Search Report of International Application No. PCT/EP2018/074634, dated Feb. 13, 2019, 2 pages.

* cited by examiner

WEDGE DRIVE HAVING ADJUSTABLE GUIDE APPARATUS

CROSS REFERENCE TO RELATED APPLICATIONS

This application is a 35 U.S.C. § 371 national phase application of International Application No.: PCT/EP2018/074634, filed Sep. 12, 2018, which claims the benefit of priority under 35 U.S.C. § 119 to German Patent Application No. 10 2018 111 366.8, filed May 14, 2018, the contents of which are incorporated herein by reference in their entirety.

FIELD

The invention relates to a wedge drive having a first and a second wedge drive part as well as an adjustable guide apparatus which guides the first and second wedge drive parts and by means of which a guide play between the first and second wedge drive parts can be set.

BACKGROUND

The statements in this section merely provide background information related to the present disclosure and several definitions for terms used in the present disclosure and may not constitute prior art.

The wedge drive usually comprises a driver, a slider as well as a slider bed. The driver and the slider bed are each fastened to a respective pressing tool and guide the slider in between them, so that the slider is guided during a stroke movement of the pressing tool by the driver and by the slider bed in a stamping or work direction which is at an angle to the stroke direction and is moved and guided between a starting position and a work position. By means of the movement in the work direction of the wedge drive, for example, a stamping or pressing at an angle to the actual stroke direction of the pressing tool is carried out.

Between the slider and the driver as well as between the slider and the slider bed, conventionally a respective guide apparatus is provided, which guides the slider both during an upward stroke and a downward stroke of the pressing tool. Usually, during a downward stroke, sliding plates fixed on the driver and on the slider bed are pressed onto sliding plates fixed on the slider. As a result, the sliding plates lie flat on one another in order to bring about a sliding guide over the entire length of the sliding plates. Due to the downward stroke, the slider is moved into the work position.

During an upward stroke of the pressing tool, during which the driver and the slider bed move apart, the slider is held at least over a portion of the stroke distance by a holding means on the driver and on the slider board and is returned into its starting position. The holding means here also forms a sliding guide by means of sliding surfaces. It can be provided that one of the sliding guides can jam if the sliding guides have excessive or incorrect guide play.

Wedge drives therefore provide that the guide play of the sliding guide of the holding means or the guide play of the sliding guide formed by the sliding plates can be set by grinding. However, in the case of wearing of the respective sliding surfaces, the problem is that material cannot be applied, so that, in the case of excessive wearing, new and exactly fitting guiding elements must be used. The production and exchange thereof are time consuming and expensive due to the required accuracy of fit.

If a guide play between the sliding surfaces is to be set, known wedge drives moreover provide partially wedge-shaped spacers which can be moved in sliding direction of the sliding guides, whereby the spacing of the sliding surfaces can be set. However, a slanted surface necessary for this purpose extends at an angle with respect to the sliding direction and likewise orthogonally to the stroke direction. Since the angled surface extends with the slope in sliding direction, the angle determining the slope must be complied with exactly, since even a small deviation over the length of the spacer extending in sliding direction would lead to an undesirable high deviation of the actual dimensions from the target dimensions. The production of such a wedge-shaped spacer having a predetermined shape is therefore very expensive and involved.

SUMMARY

The underlying aim of the present disclosure is to remedy the aforementioned disadvantages and to provide a wedge drive having an adjustable guide apparatus, the guide play of which can be produced simply and without exchange of a part, wherein it should be possible to produce the guide apparatus in an advantageous manner and simply.

This aim is achieved by a wedge drive having a first and a second wedge drive part and an adjustable guide apparatus, formed at least in part by the first and second wedge drive parts, which are movable, by means of a stroke directed in a stroke direction (Z), relative to each other in a sliding direction (X, X', X") determined by the guide apparatus and at an angle to the stroke direction (Z), guided by the guide apparatus. The guide apparatus comprises a holding clamp, the holding clamp is fixed on the first wedge drive part, and is mounted on the second wedge drive part so that it can move with a sliding guide of the guide apparatus in the sliding direction (X, X', X"), characterized in that a guide play of the sliding guide can be set by an adjustment means of the guide apparatus which comprises an adjustment surface and a forced guidance surface. By an adjustment of a position of the adjustment surface, a guide part of the guide apparatus can be moved along the forced guidance surface and the guide play can be set as a result. A normal vector (N) of the forced guidance surface is at an angle to a plane of movement spanned by the stroke direction (Z) and the sliding direction (X, X', X").

According to another aspect of the present disclosure, an adjustable guide system for the wedge drive described above and further defined herein is provided.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which.

The figures are diagrammatic examples. Identical reference numerals in the figures denote identical functional and/or structural features.

The drawings are provided herewith for purely illustrative purposes and are not intended to limit the scope of the present invention.

DETAILED DESCRIPTION

The following description is merely exemplary in nature and is in no way intended to limit the present disclosure or its application or uses. It should be understood that throughout the description, corresponding reference numerals indicate like or corresponding parts and features.

According to one aspect of the present disclosure, a wedge drive having a first and a second wedge drive part and an adjustable guide apparatus is provided. The guide apparatus is formed at least in part by the first and second wedge drive parts. The first and second wedge drive parts can be moved relative to one another by means of a stroke directed in a stroke direction. By means of the stroke, the first and second wedge drive parts are moved toward one another in a sliding direction determined by the guide apparatus and at an angle to the stroke direction. During the movement in sliding direction, the first and the second wedge drive parts are guided by the guide apparatus. The first and the second wedge drive parts are pressed onto one another during a downward stroke and pulled apart from one another during an upward stroke, wherein they adjoin one another by means of the guide apparatus in each case at least over a portion of the stroke. For this purpose, the guide apparatus comprises a holding clamp. By means of the holding clamp, the first and the second wedge drive parts are held against one another during the stroke and in particular during the upward stroke. The holding clamp is fixed on the first wedge drive part, and is mounted on the second wedge drive part so that it can move with a sliding guide of the guide apparatus in the sliding direction. A guide play of the sliding guide can be set by means of an adjustment device of the guide apparatus. The guide apparatus for this purpose comprises an adjustment surface and a forced guidance surface. By an adjustment or setting of a position of the adjustment surface, a guide part of the guide apparatus can be moved along the forced guidance surface and the guide play can be set as a result. A normal vector of the forced guidance surface is here at an angle to a plane of movement spanned by the stroke direction and the sliding direction.

The surfaces (forced guidance surface, forced guidance counter-surface, sliding surface, sliding counter-surface, adjustment surface, adjustment counter-surface, additional adjustment surface, additional adjustment counter-surface) each are formed as flat and extend in each case in an associated plane.

The sliding direction can extend along the work direction but it can also extend at an angle to the work direction.

The guide play of the sliding guide is defined as the respective distance in stroke direction of a sliding surface between the sliding guide and a sliding counter-surface of the sliding guide, when the first wedge drive part and the second wedge drive part are pressed against one another. Likewise, the guide play of the sliding guide corresponds to the guide play or to the distance in stroke direction between the sliding plates of the first and second wedge drive parts, when the first and second wedge drive parts are moved away from one another or pulled apart.

Since the normal vector of the forced guidance surface does not lie in the plane of movement, the component forming the forced guidance surface is ground not along its entire length but rather transversely thereto with a predetermined angle. Since the width transverse to the length is smaller than the length, a deviation of the angle leads to a smaller deviation of the actual shape from the target shape. Relatively less accuracy of the angle is necessary, making the production more advantageous.

According to another aspect of the present disclosure, an intersection line of the forced guidance surface and of the plane of movement extends parallel to the sliding direction. The normal vector of the forced guidance surface is consequently perpendicular to the sliding direction. Due to a movement of the guide part along the forced guidance surface, the guide play of the sliding guide can be uniformly set over the entire length of the sliding guide.

The normal vector is at an angle $\alpha$ to the plane of movement which is spanned by the sliding direction and the stroke direction. The angle $\alpha$ has a value between 0 and 90°, wherein the values 0 and 90 are excluded. Preferably, the angle $\alpha$ is between 20° and 60°.

The adjustment surface is preferably parallel to the plane of movement. The angle between the adjustment surface and the normal vector of the forced guidance surface here corresponds to the angle $\alpha$. The smaller the angle $\alpha$ is, the smaller the movement of the guide part in stroke direction is during a movement of the guide part along the forced guidance surface. Consequently, the guide play can be set more finely, the smaller the angle $\alpha$ that is selected, wherein the maximum movement of the guide part is determined by a width of the guide part in a transverse direction orthogonal to the stroke and sliding direction.

According to yet another aspect of the present disclosure, the adjustment surface is provided on an adjustment part. The position of the adjustment surface can be moved in parallel by a movement or machining, in particular by grinding of material of the adjustment part. The adjustment part is the first wedge drive part, the second wedge drive part, the holding clamp or the guide part. Alternatively, the adjustment part is an adapter part which belongs to the first wedge drive part, the second wedge drive part, the holding clamp or the guide part. If the adjustment part is formed as an adapter part, then the adjustment surface can be set by machining of the adapter part, without having to machine respectively the entire first wedge drive part, the second wedge drive part, the holding clamp or the guide part. The adapter part is then arranged preferably adjoining the guide part by a first side and adjoining the first wedge drive part, the second wedge drive part, the holding clamp or the guide part by a second opposite side.

The first wedge drive part is a driver or a slider bed, and the second wedge drive part is a slider. Alternatively, the first wedge drive part is the slider and the second wedge drive part is the driver or the slider bed. The guide apparatus can thus be formed both between the slider and the slider bed or between the slider and the driver. The holding clamp can be fastened likewise on the driver, the slider or the slider bed.

An advantageous design provides that the first wedge drive part comprises the forced guidance surface. The guide part forms the adjustment surface and a forced guidance counter-surface corresponding to the forced guidance surface. The sliding guide is determined by a sliding surface provided on the guide part and a sliding counter-surface provided on the holding clamp.

By an adjustment of the position or by a parallel movement of the adjustment surface, the guide part is moved with its forced guidance counter-surface along the forced guidance surface. Since the forced guidance surface is at an angle α with respect to the plane of movement, the movement has a movement component in transverse direction and in stroke direction. By means of the movement in stroke direction, the sliding surface can be positioned relative to the sliding counter-surface and the guide play can be set. The sliding surface can, in particular, be moved closer to the sliding counter-surface by the movement of the guide part along the forced guidance surface, when the first wedge drive part is pressed onto the second wedge drive part, and consequently the guide play can be set or reduced. If the first and the second wedge drive part are subjected to tension in stroke direction relative to one another, they are thus pulled apart, the sliding surfaces lie stably on one another, and the movement of the guide part leads to the first wedge drive part coming closer to the second wedge drive part. This applies preferably to all the embodiment variants of the wedge drive.

A different but likewise aspect of the present disclosure provides that the first wedge drive part comprises the forced guidance surface and the adjustment surface. The holding clamp forms a forced guidance counter-surface corresponding to the forced guidance surface and consequently includes the guide part preferably integrally. By a movement of the guide part, the entire holding clamp is moved. The sliding guide is determined by a sliding surface provided on the second wedge drive part and a sliding counter-surface provided on the holding clamp. The sliding surface can be positioned relative to the sliding counter-surface by adjusting the position of the adjustment surface on the first wedge drive part by a movement of the guide part with its forced guidance counter-surface along the forced guidance surface, and the guide play can be set. In particular, the sliding surface can also be moved closer to the sliding counter-surface in the process and the guide play can be set or reduced as a result. The sliding surface can be formed directly on the second wedge drive part. Alternatively the second wedge drive part is designed in two parts consisting of a main part and a sliding rail with the sliding surface, wherein the sliding rail is fixed on the main part.

A wedge drive according to another design provides that the second wedge drive part forms the forced guidance surface, the first wedge drive part forms the adjustment surface, and the holding clamp forms a forced guidance counter-surface corresponding to the forced guidance surface. Furthermore, the holding clamp includes the guide part. The holding clamp can be designed in two parts with the guide part or integrally therewith, wherein in each case by a movement of the guide part, the entire holding clamp is moved. The sliding guide is determined by the forced guidance surface and the forced guidance counter-surface. The sliding surface is formed integrally with the forced guidance surface and the sliding counter-surface is formed integrally with the forced guidance counter-surface. The forced guidance surface can be positioned relative to the forced guidance counter-surface by adjusting the position of the adjustment surface by a movement of the holding clamp with its forced guidance counter-surface along the forced guidance surface. In particular, the sliding surface can be moved closer to the sliding counter-surface or respectively the forced guidance surface can be moved closer to the forced guidance counter-surface by adjusting the position, and the guide play or the distance between the surfaces can be set and in particular reduced.

An advantageous development here provides that the second wedge drive part is formed in two parts and includes a forced guidance rail. The forced guidance rail comprises the forced guidance surface and an additional adjustment surface. The forced guidance surface can be positioned relative to the forced guidance counter-surface by adjusting the position of the additional adjustment surface by a movement of the holding clamp with its forced guidance counter-surface along the forced guidance surface. In particular, by a parallel movement by means of material ablation on the additional mounting surface, the forced guidance surface and the forced guidance counter-surface can be moved farther apart from one another, and the guide play can be set or increased.

A wedge drive preferably provides a main guide apparatus and a forced return apparatus. By means of the main guide apparatus, the slider is held together in each case with a slider bed both during the downward stroke and during the upward stroke over the entire stroke distance covered during a stroke in the stroke direction. The forced return apparatus is arranged or determined between the slider and the driver. By the forced return apparatus, the slider is held on the driver over a portion of the stroke distance during the upward stroke and is thus returned by means of a forced return guide from its work position into its original starting position.

In an alternative embodiment, the wedge drive according to the invention comprises a forced return apparatus and/or a main guide apparatus. The guide apparatus with the holding clamp forms the forced return apparatus, by means of which the first and the second wedge drive parts can be guided during an upward stroke directed in the stroke direction along the respective other wedge drive part in the sliding direction from a work position into a starting position. Alternatively, the guide apparatus forms the main guide apparatus.

Both the main guide apparatus and the forced return apparatus can be formed in each case by a guide apparatus.

A guide apparatus is preferably designed in a mirror arrangement on a plane of symmetry running through the wedge drive. Consequently, a guide apparatus comprises two holding clamps, guide parts, adapter parts, forced guidance surfaces, siding surfaces as well as associated counter-surfaces, which are arranged in a mirror arrangement with respect to the plane of symmetry.

Furthermore, according to the present disclosure, an adjustable guide system for a wedge drive is proposed. The guide system includes a guide apparatus having a first and a second wedge drive part and is formed at least in part by the first and the second wedge drive parts. The first and the second wedge drive parts can be moved, by means of a stroke directed in a stroke direction, relative to one another and in a sliding direction determined by the guide apparatus and at an angle to the stroke direction, guided by the guide apparatus. The guide apparatus comprises a holding clamp which is fixed on the first wedge drive part, and which is mounted on the second wedge drive part so that it can move with a sliding guide of the guide apparatus in the sliding direction. A guide play of the sliding guide can be set by an adjustment means of the guide apparatus which comprises an adjustment surface and a forced guidance surface. By adjusting or setting a position of the adjustment surface, a guide part of the guide apparatus can be moved along the forced guidance surface and the guide play can be set as a result. A normal vector of the forced guidance surface is at an angle to a plane of movement spanned by the stroke direction and the sliding direction.

The features disclosed above can be combined as desired to the extent that this is technically possible and to the extent that they are not mutually contradictory.

Figure 1:
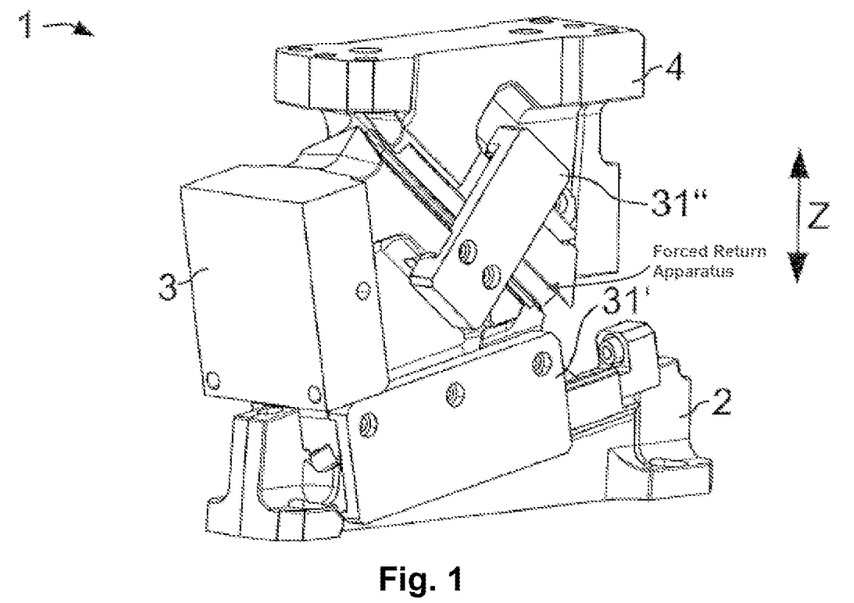
FIG. 1 shows a first wedge drive in an isometric representation.
Figure 2:
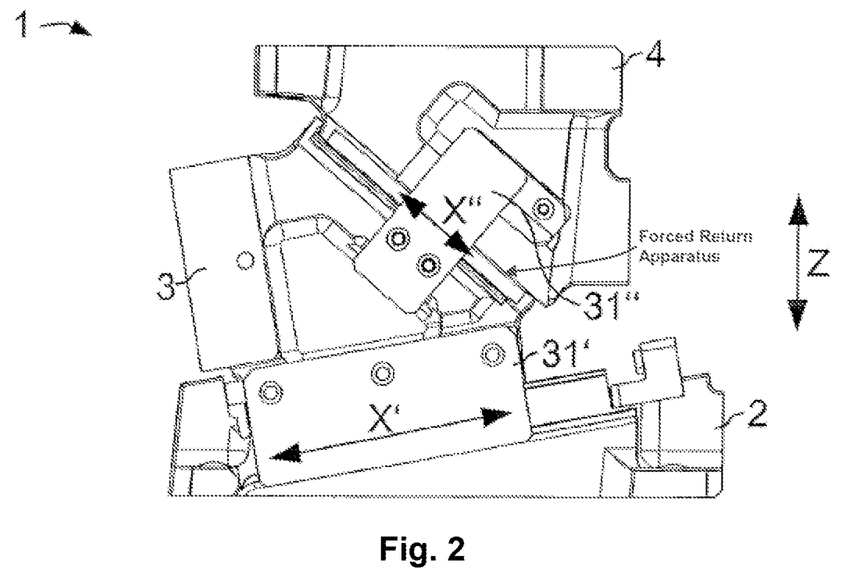
FIG. 2 shows the first wedge drive in a side view.

Referring now to FIG. 1 a first wedge drive 1 is shown in an isometric representation. FIG. 2 represents said first wedge drive in a side view. The stroke direction Z, in which the driver 4 and the slider bed 2 with the sliders 3 are moved toward one another or apart from one another, is represented in each case by an arrow. Between the driver 4 and the slider 3 as well as between the slider bed 2 and the slider 3 a guide apparatus is provided in each case. The guide apparatus between the slider bed 2 and the slider 3 is formed as main guide apparatus with a holding clamp 31' and the guide apparatus between the driver 4 and the slider 3 is formed as forced return apparatus with a holding clamp 31". The holding clamps 31', 31" are each fixed on the respective slider 3 and mounted on the respective other part of the wedge drive 1 (driver 4 or slider bed 2) by means of a sliding guide in a respective sliding direction X', X". But alternatively, the holding clamps 31', 31" can also be fixed on the respective driver 4 or the slider bed 2 and mounted on the slider 3 by means of a sliding guide so that they can be moved in a respective sliding direction X', X". The wedge drive 1 is located in its work position, in which the slider 3 is moved in the sliding directions X', X" out of its starting position.

Figure 3:
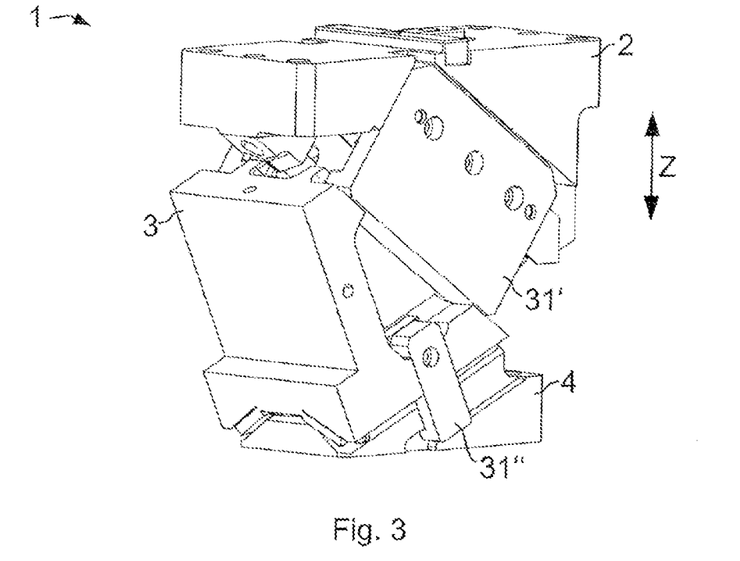
FIG. 3 shows a second wedge drive in an isometric representation.
Figure 4:
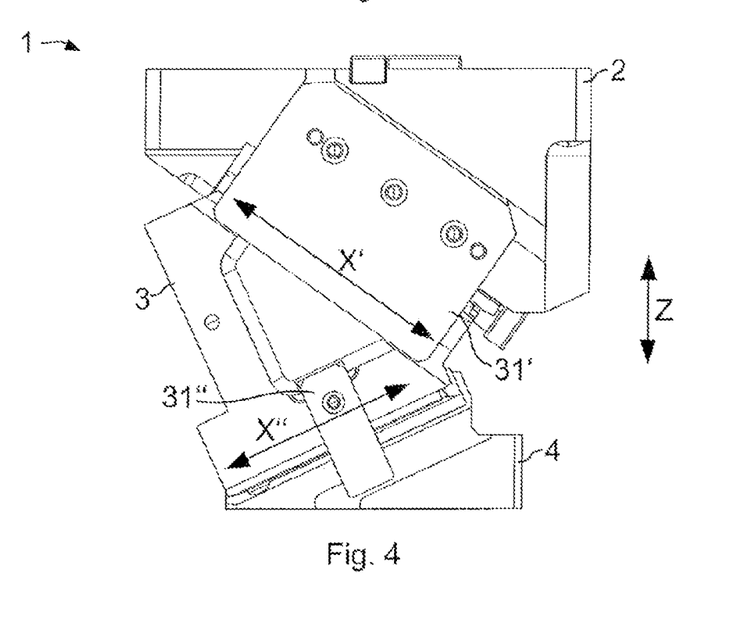
FIG. 4 shows the second wedge drive in a side view.

FIGS. 3 and 4 show a second wedge drive 1, according to an alternative embodiment. The wedge slider reproduced in FIGS. 1 and 2 is a lower section slider and the wedge slider shown in FIGS. 3 and 4 it is an upper section slider. In the case of the wedge drive 1 of FIGS. 3 and 4, the holding clamp 31' of the guide apparatus is fixed on the slider bed 2 between the slider bed 2 and the slider 3.

In FIGS. 5 to 8, in each case an alternative embodiment of a wedge drive is partially shown in section or cross section. The section or cross section in each case runs orthogonally to the sliding direction X and through a respective holding clamp 31. In each case, a first wedge drive part 10 and a second wedge drive part 20 can be seen, wherein the first wedge drive part 10 can be the slider 3, and the second wedge drive part 20 can be the slider bed 2 or the driver 4. Alternatively, the second wedge drive part 20 is the slider 3 and the first wedge drive part 10 is the slider bed 2 or the driver 4.

Depending on whether the first wedge drive part 10 is the slider 3 and the second wedge drive part 20 is the slider bed 2 or the driver 4, the sliding direction X corresponds to the sliding direction X' or the sliding direction X". If the first wedge drive part 10 is the driver bed 2, and the second wedge drive part 20 is the slider 3, the sliding direction corresponds to the sliding direction X". In an embodiment having the first wedge drive part 10 as slider bed 4 and the second wedge drive part 20 as slider 3, the sliding direction is the sliding direction X'.

The sliding direction X is represented perpendicular to the plane of the representation and pointing out of said plane of representation. The stroke direction Z is represented in each case as projection Z' of the stroke direction Z into the plane of the representation (below, the projection Z' is also referred to as stroke direction Z').

On the first wedge drive part 10, sliding plates 11 facing the second wedge drive part 20 are arranged, and, on the second wedge drive part 20, sliding plates 21 facing the first wedge drive part 10 are arranged. The sliding plates 11, 21 are represented adjoining one another and are intended to guide the first and second wedge drive parts 10, 20 during a downward stroke. During a downward stroke, in which the driver 4 and the slider bed 2 are moved in stroke direction Z toward one another, the first and the second wedge drive parts 10, 20 are pressed against one another at least over a portion of the downward stroke. The holding clamps 32 are fixed in each case on the first wedge drive part 10 by means of screws.

In each case, a plane of movement lying orthogonally to the plane of the representation is spanned by the stroke direction Z' and the sliding direction X.

The guide apparatuses between the first and second wedge drive parts 10, 20 of FIGS. 5 to 8 comprise in each case a forced guidance surface 34, between the normal vector N of which and the plane of movement an angle α is defined. For a better illustration, the normal vector N is represented in addition in each case as a vector N' moved in parallel to the origin of a coordinate system. The coordinate system is spanned by the stroke direction Z or projection Z' of the stroke direction Z, the sliding direction X, and a transverse direction Y orthogonal to stroke direction Z' and sliding direction X.

In the different embodiment examples shown in FIGS. 5 to 8 that the guide apparatus forms a forced guidance surface 34 along which a guide part 32 can be moved. The guide part is here moved along the vector V parallel to the forced guidance surface 34. The movement along the vector V in each case has a component in transverse direction Y and stroke direction Z', whereby the guide part 32 is in each case moved in stroke direction Z' and the respective sliding surface 35 is moved relative to the respective sliding counter-surface 35'.

By a parallel movement of the respective adjustment surface 33 by ablation of material, the sliding surface 35 and the sliding counter-surface 35' can be moved toward one another. The guide play of the sliding guide formed by the sliding surface 35 and the sliding counter-surface 35' is reduced as a result.

The angle α determines the slope of the forced guidance surface 34 with respect to a plane spanned by the sliding direction X and the transverse direction Y. An error or an incorrect angle α in the production of the forced guidance surface 34, due to the relatively small extent of the forced guidance surface 34 in transverse direction Y, leads only to a slight deviation of the actual dimension from the target dimensions of the forced guidance surface 34.

Figure 5:
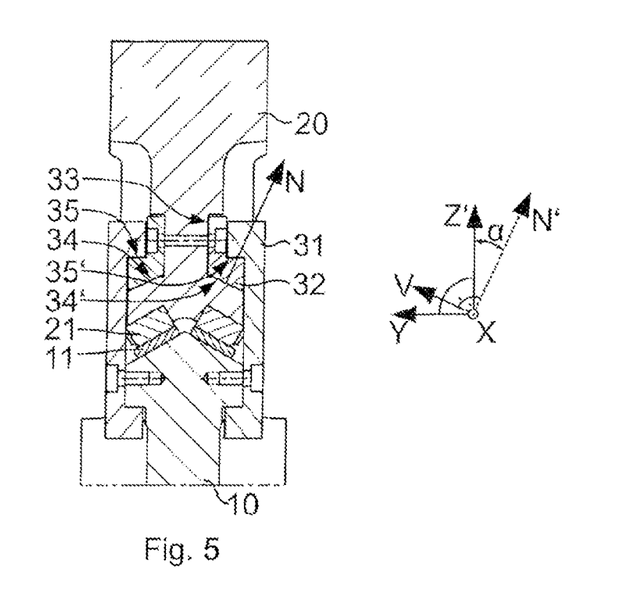
FIG. 5 shows a section according to a first aspect of a wedge drive.

In the example of FIG. 5, the forced guidance surface 34 is formed on the second wedge drive part 20. The guide part 32 comprises the adjustment surface 33. The guide part 32 is pressed via the adjustment surface 33 by screw connection onto the second wedge drive part 20. By grinding the guide part 32 on the side of the adjustment surface 33, the adjustment surface 33 is redetermined or moved in parallel. The screw connection runs through an elongate hole in the guide part 32, so that the guide part 32 with the adjustment surface 32 moved in parallel can be fastened again on the second wedge drive part. By ablation of material on the guide part 32, said guide part is moved in its new position with respect to its original position in transverse direction Y, wherein the guide part 32 is moved at the same time with its forced guidance counter-surface 34' along the counter guidance surface 34 in stroke direction Z'. If the wearing of the sliding surface 35 reaches a maximum value which can no longer be corrected by moving the guide part 32 along the forced guidance surface 34, the guide part 32 can be quickly and simply exchanged.

Figure 6:
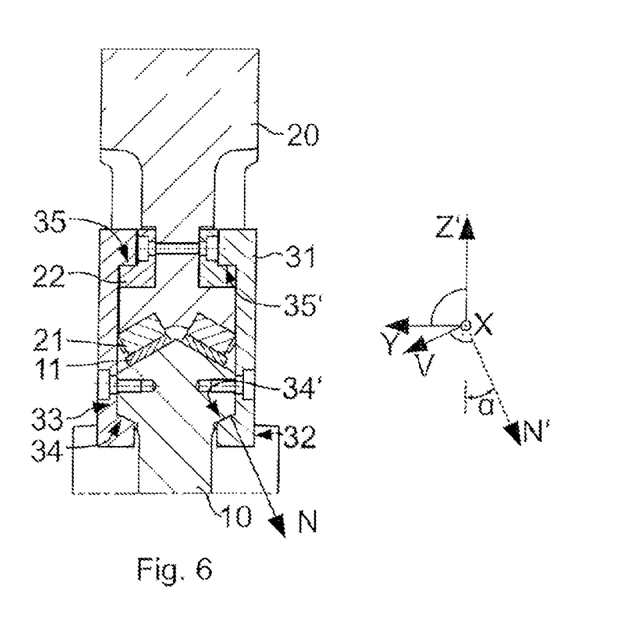
FIG. 6 shows a section according to a second aspect of a wedge drive.

In the example represented in FIG. 6, the forced guidance surface 34 is formed on the first wedge drive part 10. The guide part 32 is formed integrally with the holding clamp 31. Furthermore, the second wedge drive part 20 consists of two parts. The second wedge drive part 20 comprises a sliding rail 22 which has the sliding surface 35. If there is considerable wearing of the sliding surface 35, the sliding rail 22 can be exchanged and subsequently the guide play can be set. The adjustment surface 33 is here formed by a lateral surface of the first wedge drive part, which points in transverse direction Y. By grinding the lateral surface, the adjustment surface 33 and the holding clamp 31 adjoining an adjustment counter-surface are moved in parallel in transverse direction Y, so that the holding clamp 31 moves with its forced guidance counter-surface 34' formed on the guide part 32 along the forced guidance surface 34 in the transverse direction Y and the stroke direction Z'. By moving the holding clamp 31 in stroke direction Z', the sliding counter-surface 35' formed on the holding clamp 31 is moved closer to the sliding surface 35 or the first wedge drive part 10 is moved closer to the second wedge drive part 20, and the guide play is set.

Figure 7:
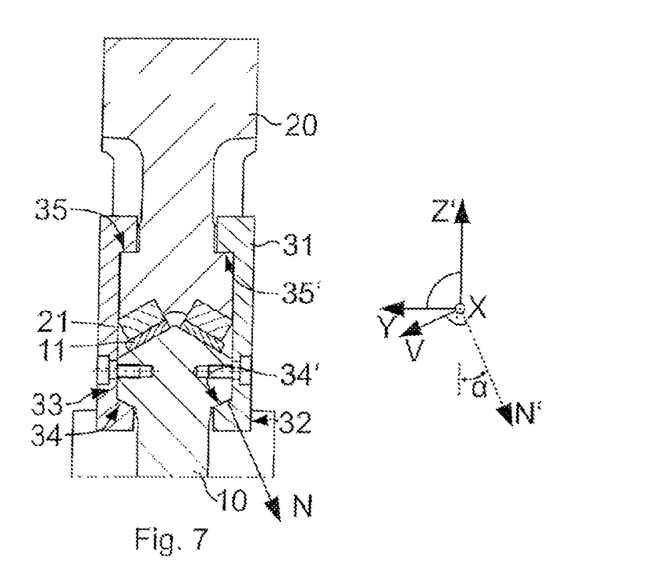
FIG. 7 shows a section according to a third aspect of a wedge drive.

FIG. 7 shows a section of a wedge drive similar to the one from FIG. 6, wherein the second wedge drive part 20 consists of one part and directly forms the sliding surface 35.

Figure 8:
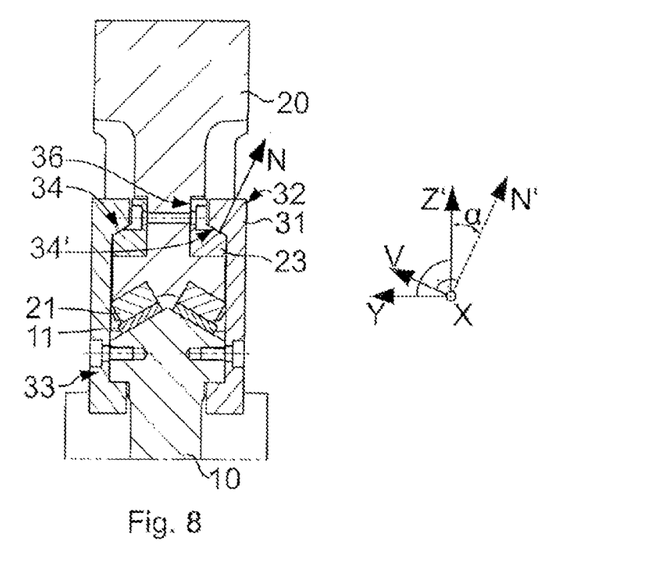
FIG. 8 shows a section according to a fourth aspect of a wedge drive.

In the alternative example represented in FIG. 8, the guide part 32 is also formed integrally with the holding clamp 31. The second wedge drive part 20 consists of two parts and comprises a forced guidance rail 23 which is pressed via a connection means with an additional adjustment surface 36 against a base body of the wedge drive part 20. The forced guidance rail 23 moreover forms the forced guidance surface 34, which the forced guidance counter-surface 34' of the holding clamp 32 adjoins. In the present embodiment, the holding clamp 32 with its forced guidance counter-surface 34' slides in sliding direction X along the forced guidance surface 34, so that the forced guidance surface 34 likewise forms the sliding surface and the forced guidance counter-surface forms the sliding counter-surface.

The adjustment surface 33 is formed on a side of the first wedge drive part 10 pointing in transverse direction Y and on which the holding clamp 32 is fixed. By a parallel movement of the adjustment surface 33, for example, by grinding the side of the first wedge drive part 10, the holding clamp 32 is moved in transverse direction Y, as a result of which the guide part 32 moves along the forced guidance surface 34 in stroke direction Z'. Due to the movement in stroke direction Z', the first wedge drive part 10 and the second wedge drive part 20 are moved closer to one another, and the guide play is set as a result. Considering the state in which the first wedge drive part 10 and the second wedge drive part 20 are pressed toward one another, the forced guidance counter-surface 34' in its function as sliding counter-surface is moved closer to the forced guidance surface 34 in its function as sliding surface. If the first wedge drive part 10 and the second wedge drive part 20 are pulled apart, the forced guidance counter-surface 34' and the forced guidance surface 34 adjoin one another, wherein, as a result of the movement in stroke direction Z', the first and the second wedge drive parts 10, 20 are moved closer to one another.

By a parallel movement of the additional adjustment surface 36 on the forced guidance rail 23, for example by grinding, the opposite effect can be achieved. The forced guidance surface 34 can be detached from the forced guidance counter-surface 34', or, as a result of the movement of the forced guidance counter-surface 34' along the forced guidance surface 34 in stroke direction Z', the first and the second wedge drive parts 10, 20 are spaced from one another.

By means of the adjustment surface 33 and the additional adjustment surface 36, the guide play can consequently be increased or decreased. By the decrease or increase, the guide play can be set or adjusted exactly to a predetermined value.

Figure 9:
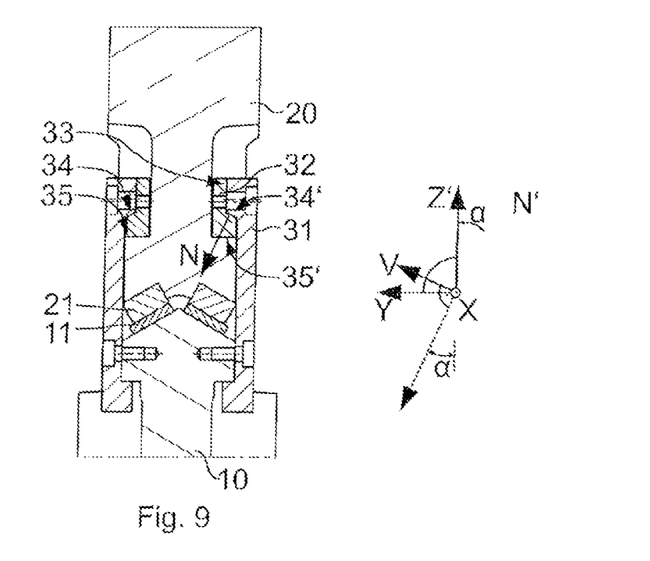
FIG. 9 shows a section according to a fifth aspect of a wedge drive.
Figure 10:
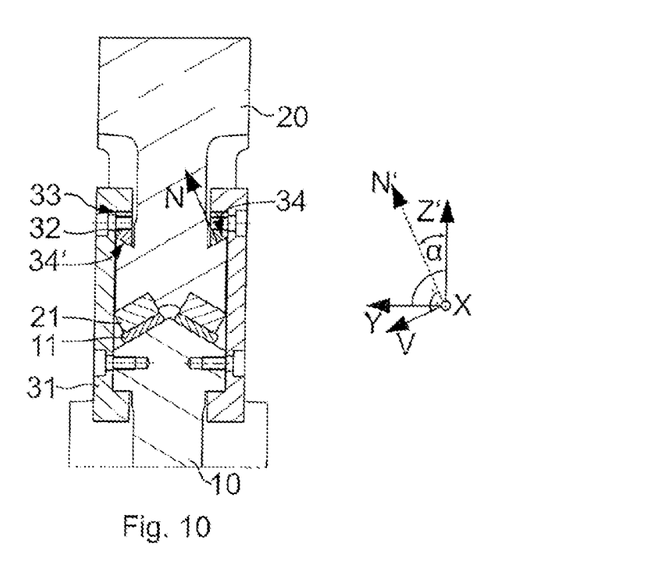
FIG. 10 shows a section according to a sixth aspect of a wedge drive.

FIGS. 9 and 10 in each case show an alternative example of a wedge drive 1 or a section through a first and a second wedge drive part 10, 20.

In the variant of FIG. 9, the forced guidance surface 34 is provided on the holding clamp 31 and the forced guidance counter-surface 34' is provided on the guide part 32. By a parallel movement of the adjustment surface 33, the guide part 32 is moved in transverse direction Y closer to the holding clamp 31, as a result of which the forced guidance counter-surface 34' moves along the forced guidance surface 34 and the guide part 32 is moved in the stroke direction Z'. As a result, the sliding counter-surface 35' formed on the guide part 32 is moved closer to the sliding surface 35 formed on the second wedge drive part 20. The advantage here is that the adjustment of the guide apparatus is formed completely on the holding clamp 31 or connected thereto, and wearing parts can simply be exchanged. Since the adjustment of the guide apparatus can be implemented completely on the holding clamp 33 in cooperation with the guide part 32, the forced guidance surface 34 and the forced guidance counter-surface 34' only need to be formed over the length of the holding clamp 33 in sliding direction X. The manufacturing tolerances to be complied with for the adjustment on the forced guidance surface 34 and forced guidance counter-surface 34' therefore have to be complied with only over the length of the holding clamp 32 in sliding direction X and not over the entire extent of the sliding guide in sliding direction X. In addition, it is also possible to provide the adjustment surface 33 on the guide part 32.

In FIG. 10, an additional example is shown, in which the guide part 32 is fixed on the holding clamp 31. The forced guidance surface 34 is provided on the second wedge drive part 20, wherein its normal vector N is tilted inward toward a plane of symmetry of the second wedge drive part 20, which is not represented. The external section of the forced guidance surface 33 forms a projection with respect to the internal section. The guide part 32 with the forced guidance counter-surface 34' corresponding to the forced guidance surface 34 engages the projection from behind. As a result of this engagement from behind, the guide part 32 and the holding clamp 31 fixed thereto cannot be detached from the second wedge drive part 20. Here, the forced guidance surface 34 and the forced guidance counter-surface 34' at the same time form the sliding surface and the sliding counter-surface. In the embodiment example shown here, the adjustment surface 33 is provided on the guide part 32; however, additionally or alternatively, it can also be formed on the holding clamp 31 in the zone in which the guide part 32 adjoins the holding clamp 32 in transverse direction Y. By ablation of material on the adjustment surface 33 by mechanical machining, a parallel movement of the adjustment surface 33 can be implemented, by means of which the guide part 32 is moved in transverse direction Y outward. Guided by the forced guidance surface 34, the holding clamp in the process moves in stroke direction Z' upward, whereby the guide play between forced guidance surface 34 and forced guidance counter-surface 34' can be adjusted or the first wedge drive part can be moved closer to the second wedge drive part 10, 20.

Within this specification, embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

The invention is not limited in its design to the preferred embodiments or examples indicated above. Instead, a number of variants are conceivable, which also use the represented solution even in designs of fundamentally different type.

While the above description constitutes the preferred embodiments of the present invention, it will be appreciated that the invention is susceptible to modification, variation and change without departing from the proper scope and fair meaning of the accompanying claims.

The invention claimed is:

1. A wedge drive having a first and a second wedge drive part and an adjustable guide apparatus, formed at least in part by the first and second wedge drive parts, which are movable, by means of a stroke directed in a stroke direction (Z), relative to each other in a sliding direction (X, X', X") determined by the guide apparatus and at an angle to the stroke direction (Z), guided by the guide apparatus, wherein
the guide apparatus comprises a holding clamp,
the holding clamp is fixed on the first wedge drive part, and is mounted on the second wedge drive part so that it can move with a sliding guide of the guide apparatus in the sliding direction (X, X', X"), characterized in that
a guide play of the sliding guide can be set by an adjustment means of the guide apparatus which comprises an adjustment surface and a forced guidance surface, wherein,
the adjustment surface is provided on an adjustment part, which is arranged between and in direct abutment with the second wedge drive part and the holding clamp, and the position of the adjustment surface is moved in parallel upon ablation of material of the adjustment part, wherein,
by an adjustment of a position of the adjustment surface, a guide part of the guide apparatus can be moved along the forced guidance surface and the guide play can be set as a result, wherein,
a normal vector (N) of the forced guidance surface is at an angle to a plane of movement spanned by the stroke direction (Z) and the sliding direction (X, X', X"), wherein,
the first wedge drive part is a driver or a slider bed, and the second wedge drive part is a slider, or the first wedge drive part is the slider, and the second wedge drive part is the slider bed, such that the guide apparatus is located between the slider and the slider bed or the driver wherein,
the second wedge part comprises the forced guidance surface, the guide part forms the adjustment surface and a forced guidance counter-surface corresponding to the forced guidance surface, and the sliding guide is determined by a sliding surface provided on the guide part and a sliding counter-surface provided on the holding clamp, wherein,
the sliding surface can be positioned relative to the sliding counter-surface, by adjusting the position of the adjustment surface on the guide part by a movement of the guide part with its forced guidance surface along the forced guidance surface, and the guide play can be set.

2. The wedge drive according to claim 1, wherein
an intersection line of the forced guidance surface and of the plane of movement is parallel to the sliding direction (X, X', X").

3. The wedge drive according to claim 1, wherein
the normal vector (N) is at an angle α to the plane of movement, and the angle α has a value between 0 and 90°, wherein the values 0 and 90 are excluded.

4. The wedge drive according to claim 3, wherein the angle α has a value between 20° and 60°.

5. The wedge drive according to claim 1, wherein
the first wedge drive part comprises the forced guidance surface,
the adjustment part is the first wedge drive part,
the holding clamp forms the forced guidance counter-surface corresponding to the forced guidance surface and includes the guide part, and
the sliding guide is determined by a sliding surface provided on the second wedge drive part and a sliding counter-surface provided on the holding clamp, wherein
the sliding surface can be positioned relative to the sliding counter-surface, by adjusting the position of the adjustment surface on the first wedge drive par by a movement of the guide part with its forced guidance counter-surface along the forced guidance surface, and the guide play can be set.

6. The wedge drive according to claim 5, wherein the sliding surface is moved closer to the sliding counter-surface.

7. The wedge drive according to claim 1, wherein
the second wedge drive part forms the forced guidance surface,
the adjustment part is the first wedge drive part,
the first wedge drive part forms the adjustment surface,
the holding clamp forms a forced guidance counter-surface corresponding to the forced guidance surface and includes the guide part, and
the sliding guide is determined by the forced guidance surface and the forced guidance counter-surface,
wherein the forced guidance surface can be positioned relative to the forced guidance counter-surface, by adjusting the position of the adjustment surface by a movement of the holding clamp with its forced guidance counter-surface along the forced guidance surface, and the guide play can be set.

8. The wedge drive according to claim 7, wherein
the second wedge drive part is formed by two parts and comprises a forced guidance rail with the forced guidance surface and an additional adjustment surface, and
the forced guidance surface can be positioned relative to the forced guidance counter-surface, by adjusting the position of the additional adjustment surface by a movement of the holding clamp—with its forced guidance counter-surface along the forced guidance surface, and the guide play can be set.

9. The wedge drive according to claim 7, wherein the forced guidance surface is moved closer to the forced guidance counter-surface.

10. The wedge drive according to claim 7, wherein the forced guidance surface is moved away from the forced guidance counter-surface.

11. The wedge drive according to claim 1, wherein
said wedge drive comprises a forced return apparatus which is formed by the guide apparatus with the holding clamp, by means of which the first wedge drive part or the second wedge drive part can be guided, in the case of an upward stroke directed in the stroke direction (Z), along the respective other wedge drive part in the sliding direction (X, X', X") from a work position into a starting position.

12. The wedge drive according to claim 1, wherein the sliding surface is moved closer to the sliding counter-surface.

13. An adjustable guide system for a wedge drive including a guide apparatus having a first and a second wedge drive part, which is formed by the first and second wedge drive parts, wherein
the first and the second wedge drive parts can be moved by means of a stroke directed in a stroke direction (Z) relative to one another as well as in a sliding direction (X, X', X") determined by the guide apparatus and at an angle to the stroke direction (Z), guided by the guide apparatus, wherein
the guide apparatus comprises a holding clamp,
the holding clamp is fixed on the first wedge drive part and is mounted on the second wedge drive part so that it can be moved in the sliding direction (X, X', X") with a sliding guide of the guide apparatus, characterized in that
a guide play of the sliding guide can be set by an adjustment means of the guide apparatus which comprises an adjustment surface and a forced guidance surface, the adjustment surface being provided on an adjustment part, which is arranged between and in direct abutment with the second wedge drive part and the holding clamp, with the position of the adjustment surface being moved in parallel upon ablation of material of the adjustment part,
wherein, by adjusting a position of the adjustment surface, a guide part of the guide apparatus can be moved along the forced guidance surface and the guide play can be set as a result, wherein
a normal vector (N) of the forced guidance surface is at an angle to a plane of movement spanned by the stroke direction (Z) and the sliding direction (X, X', X"), wherein,
the first wedge drive part is a driver or a slider bed, and the second wedge drive part is a slider, or the first wedge drive part is the slider, and the second wedge drive part is the slider bed, such that the guide apparatus is located between the slider and the slider bed or the driver wherein,
the second wedge part comprises the forced guidance surface, the guide part forms the adjustment surface and a forced guidance counter-surface corresponding to the forced guidance surface, and the sliding guide is determined by a sliding surface provided on the guide part and a sliding counter-surface provided on the holding clamp, wherein,
the sliding surface can be positioned relative to the sliding counter-surface, by adjusting the position of the adjustment surface on the guide part by a movement of the guide part with its forced guidance surface along the forced guidance surface, and the guide play can be set.

* * * * *